United States Patent
Ryu et al.

(10) Patent No.: US 10,001,756 B2
(45) Date of Patent: Jun. 19, 2018

(54) SMART WATCH INCLUDING A PRINTED CIRCUIT BOARD HAVING A HOLE AT THE CENTER

(71) Applicant: SAMSUNG ELECTRONICS CO., LTD., Suwon-si, Gyeonggi-do (KR)

(72) Inventors: Hyung-Real Ryu, Seoul (KR); Ki-Hyoun Kwon, Hwaseong-si (KR); Yong-Jae Kim, Seoul (KR); Sung Bum Cho, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 19 days.

(21) Appl. No.: 15/374,374

(22) Filed: Dec. 9, 2016

(65) Prior Publication Data

US 2017/0168462 A1  Jun. 15, 2017

(30) Foreign Application Priority Data

Dec. 11, 2015  (KR) ........................ 10-2015-0177393

(51) Int. Cl.
*G04G 17/02* (2006.01)
*G04R 60/08* (2013.01)
*G04B 47/06* (2006.01)
*G06Q 20/32* (2012.01)

(52) U.S. Cl.
CPC ........... *G04G 17/02* (2013.01); *G04B 47/063* (2013.01); *G04R 60/08* (2013.01); *G06Q 20/3278* (2013.01)

(58) Field of Classification Search
CPC .. G04R 60/08; G04B 47/063; G06Q 20/3278; G04G 17/02
See application file for complete search history.

(56) References Cited

U.S. PATENT DOCUMENTS

| | | | | |
|---|---|---|---|---|
| 4,496,246 A | * | 1/1985 | Ota | G04B 19/25 368/220 |
| 5,446,703 A | * | 8/1995 | Schwartz | G04B 19/30 368/80 |
| 5,566,136 A | * | 10/1996 | Schwartz | G04B 19/247 368/35 |
| 6,502,981 B2 | | 1/2003 | Haida | |
| 7,016,265 B2 | * | 3/2006 | Born | G04C 3/066 368/162 |

(Continued)

FOREIGN PATENT DOCUMENTS

| | | |
|---|---|---|
| KR | 1020010035404 | 5/2001 |
| KR | 1020040046692 | 6/2004 |

(Continued)

*Primary Examiner* — Sean Kayes
(74) *Attorney, Agent, or Firm* — F. Chau & Associates, LLC (57) ABSTRACT

A watch including a dial pad, a circular movement disposed adjacent to the dial pad, a circular printed circuit board (PCB) having an inner diameter and an outer diameter, the PCB including a hole defined as the inner diameter and a plurality of integrated circuits (ICs) disposed in a region between the inner diameter and the outer diameter, in which the movement having a diameter smaller than the inner diameter is shaped and sized to fit into the hole, a first battery disposed adjacent to the PCB and supplies a first operating voltage only to the PCB, and a case dimensioned and shaped to receive the dial pad, the movement, the PCB, and the first battery.

20 Claims, 9 Drawing Sheets

(56) References Cited

U.S. PATENT DOCUMENTS

| | | | |
|---|---|---|---|
| 7,306,364 B2* | 12/2007 | Born | G04B 17/063 368/148 |
| 7,794,139 B2 | 9/2010 | Barbier | |
| 8,708,552 B2* | 4/2014 | Ueno | G04G 17/08 368/276 |
| 2005/0036405 A1* | 2/2005 | Born | G04B 17/063 368/127 |
| 2005/0073913 A1* | 4/2005 | Born | G04C 3/066 368/127 |
| 2010/0296369 A1 | 11/2010 | Tortora | |
| 2014/0323042 A1 | 10/2014 | Lee et al. | |
| 2016/0246326 A1* | 8/2016 | von Badinski | G01P 15/00 |

FOREIGN PATENT DOCUMENTS

| | | |
|---|---|---|
| KR | 1020050112617 | 12/2005 |
| KR | 1020070024067 | 3/2007 |
| KR | 100834632 | 5/2008 |
| KR | 1020140062274 | 5/2014 |
| KR | 1020150007588 | 1/2015 |
| KR | 101492779 | 2/2015 |
| KR | 1020150029452 | 3/2015 |

\* cited by examiner

SMART WATCH INCLUDING A PRINTED CIRCUIT BOARD HAVING A HOLE AT THE CENTER

CROSS-REFERENCE TO RELATED APPLICATIONS

This application claims priority under 35 U.S.C. § 119 from Korean Patent Application No. 10-2015-0177393 filed in the Korean Intellectual Property Office on Dec. 11, 2015, the disclosure of which is hereby incorporated by reference in its entirety.

TECHNICAL FIELD

The described technology relates generally to a smart watch and more particularly to a smart watch including a printed circuit board having a hole at the center and a movement shaped and sized to fit into the hole.

DISCUSSION OF RELATED ART

A smart watch is a computerized wristwatch with functionality that is enhanced beyond time keeping. Most smart watches may be used as a small smart phone in a form of being worn on a user's wrist. A smart phone is a cellular phone that performs many functions of a computer, typically having a touch screen interface and an operating system capable of running downloaded applications. The smart watch including a clock function is worn on a wrist of a user like a watch, but when a battery included in the smart watch is completely discharged, the clock function of the smart watch cannot be used until the battery is recharged. A smart band is a mobile device worn on a user's wrist often with a display, which may be used for fitness and may control a smart phone.

A basic structure of a traditional mechanical watch in the related art may have a vertical structure of glass, bezel, hands, dial pad, movement, case part, and case back. In such a structure, since a size of the movement is generally smaller than a diameter of the dial pad and the case part, a part for affixing the movement to the case is additionally required. The part for affixing the movement substantially only serves to physically affix the movement to the case and does not have special functionality.

SUMMARY

Embodiments of the present invention provide utilizing a function and shape of a traditional mechanical watch and embodying functions of a smart device through utilizing a space used substantially only for affixing a mechanical part in the traditional mechanical watch. A watch according to embodiments of the present invention may include a printed circuit board (PCB) having a hole at the center, a movement sized and shaped to fit into the hole, and a clock function and a smart function which may be physically separated from each other, thereby allowing the watch to perform the clock function even though a battery for the smart function is discharged.

An exemplary embodiment of the present invention is directed to a watch, the watch may include a dial pad, a circular movement which may be disposed adjacent to the dial pad, a circular printed circuit board (PCB) having an inner diameter and an outer diameter, the PCB may include a hole defined as the inner diameter and a plurality of integrated circuits (ICs) disposed in a region between the inner diameter and the outer diameter, in which the movement having a diameter smaller than the inner diameter may be shaped and sized to fit into the hole, a first battery which may be disposed adjacent to the PCB and may supply a first operating voltage only to the PCB, and a case dimensioned and shaped to receive the dial pad, the movement, the PCB, and the first battery.

The movement may be a mechanical movement. The PCB may be shaped as a donut or a C shape.

According to an embodiment of the present invention, the watch may further include a bezel connected to an upper portion of the case, in which one of the plurality of ICs may be a wireless communication module for performing wireless communications with an external wireless device through the bezel and the bezel may be used as an antenna of the wireless communication module. According to an embodiment of the present invention, one of the plurality of ICs may be a display driver IC and the display driver IC may drive the dial pad serving as a display device.

According to an embodiment of the present invention, the watch may further include a bezel connected to an upper portion of the case and a transparent display device connected to the bezel, in which one of the plurality of ICs may drive the transparent display device. According to an embodiment of the present invention, the watch may further include a second battery electrically connected to the movement and not electrically connected to the PCB supplying a second operating voltage to the movement.

According to an embodiment of the present invention, the watch may further include a case back connected to a lower portion of the case and at least one bio sensor disposed on at least one of the case or the case back and may collect biological information of a user, in which the plurality of ICs may include a bio-processor for processing the biological information output from the at least one bio sensor and a memory for receiving and storing information processed by the bio-processor.

According to an embodiment of the present invention, the plurality of ICs may include a processor for executing a mobile payment application, a security module including a memory for storing user payment information, and a wireless communication module, in which the mobile payment application executed by the processor performs a mobile payment together with an external wireless payment device through the wireless communication module using the user payment information.

According to an embodiment of the present invention, the watch may further include a case back connected to a lower portion of the case and at least one bio sensor disposed on at least one of the case or the case back and may collect biological information of a user, in which the plurality of ICs may include a security module including a memory for storing authentication information of a user and a processor which may process the biological information output from the at least one bio sensor, compare processed biological information with the authentication information read from the memory, and authenticate the user according to a result of the comparison.

An exemplary embodiment of the present invention is directed to a watch, the watch may include a dial pad, a circular movement which may be disposed adjacent to the dial pad, a circular printed circuit board (PCB) having an inner diameter and an outer diameter, the PCB may include a hole defined as the inner diameter and a plurality of integrated circuits (ICs) disposed in a region between the inner diameter and the outer diameter, in which the movement having a diameter smaller than the inner diameter may be sized and shaped to fit into the hole, a first battery which may be disposed adjacent to the PCB and may supply a first operating voltage only to the PCB, and a case dimensioned and shaped to receive the dial pad, the movement, the PCB, and the first battery, in which the plurality of ICs may include a wireless communication module, a display driver IC, and an application processor.

The movement may be a mechanical movement. The PCB may be shaped as a donut or a C shape. According to an embodiment of the present invention, the watch may further include a bezel connected to an upper portion of the case, in which the wireless communication module may be connected to the bezel through a wire and the bezel may be used as an antenna of the wireless communication module. The display driver IC may transmit display data to the dial pad serving as a display device.

According to an embodiment of the present invention, the watch may further include a bezel connected to an upper portion of the case and a transparent display device connected to the bezel, in which the display driver IC may transmit display data to the transparent display device.

An exemplary embodiment of the present invention is directed to a watch, the watch may include a dial pad, a circular mechanical movement which may be disposed adjacent to the dial pad, a circular printed circuit board (PCB) having an inner diameter and an outer diameter, the PCB may include a hole defined as the inner diameter and a plurality of integrated circuits (ICs) disposed in a region between the inner diameter and the outer diameter, in which the mechanical movement having a diameter smaller than the inner diameter may be sized and shaped to fit into the hole, a first battery which may be disposed adjacent to the PCB and may supply a first operating voltage only to the PCB, and a case dimensioned and shaped to receive the dial pad, the mechanical movement, the PCB, and the first battery.

According to an embodiment of the present invention, the watch may further include a bezel connected to an upper portion of the case, in which one of the plurality of ICs is a wireless communication module for performing wireless communications with an external wireless device through the bezel and the bezel is used as an antenna of the wireless communication module. According to an embodiment of the present invention, one of the plurality of ICs may be a display driver IC and the display driver IC may drive the dial pad serving as a display device. According to an embodiment of the present invention, the watch may further include a bezel connected to an upper portion of the case and a transparent display device connected to the bezel, in which one of the plurality of ICs may drive the transparent display device.

BRIEF DESCRIPTION OF THE DRAWINGS

Since the drawings in FIGS. 1-10 are intended for illustrative purposes, elements in the drawings are not necessarily drawn to scale. For example, some of the elements may be enlarged or exaggerated for clarity purposes.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments of the present invention are described below to explain the present general inventive concept by referring to the figures. As those skilled in the art would realize, the described embodiments of the present invention may be modified in various different ways, all without departing from the spirit or scope of the present inventive concept.

It will be understood that although the terms "the first", "the second", etc. may be used herein to describe various components, these components should not be limited by these terms. These components are only used to distinguish one component from another. As used herein, the singular forms "a", "an" and "the" are intended to include the plural forms as well, unless the context clearly indicates otherwise.

Figure 1:
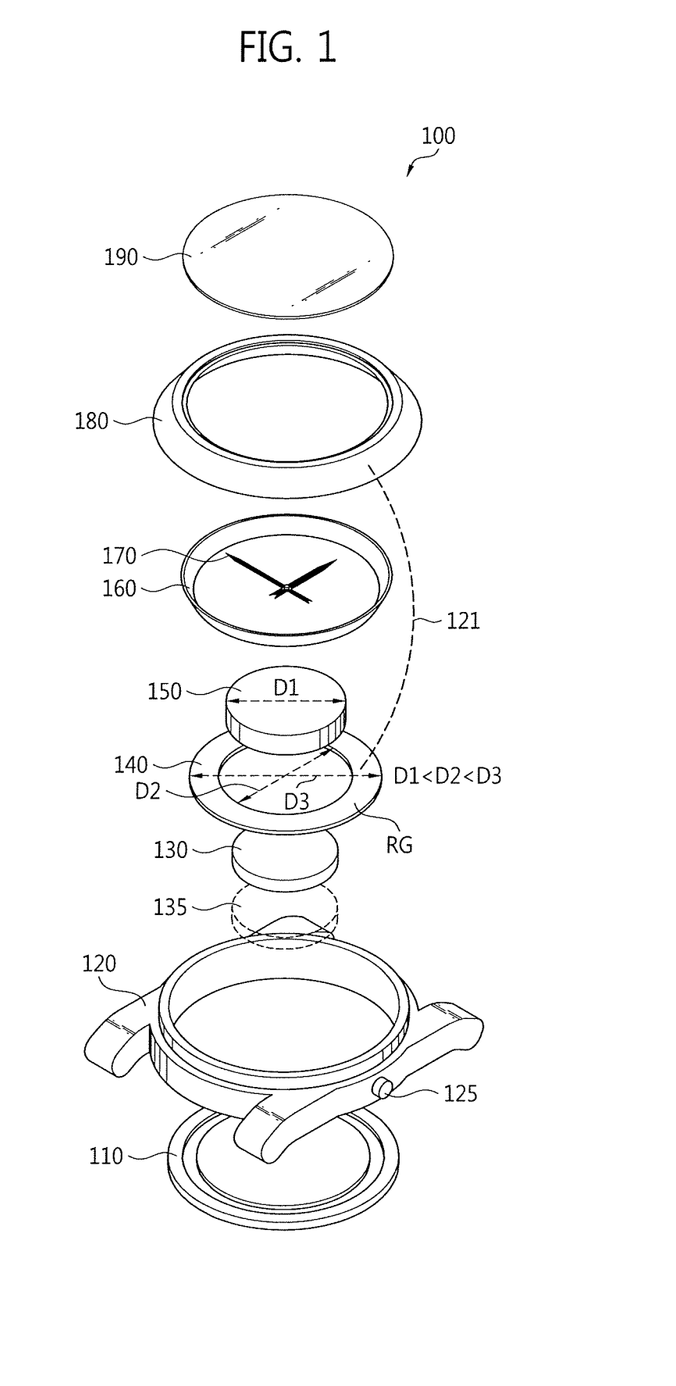
FIG. 1 is an exploded view of a watch according to an embodiment of the present invention.

FIG. 1 is an exploded view of a watch according to an embodiment of the present invention. Referring to FIG. 1, a watch 100 may include a glass 190, a bezel 180, hands 170, a dial pad 160, a movement 150, a printed circuit board (PCB) 140, at least one of batteries 130 or 135, a case 120, and a case back 110. The watch 100 may be an embodiment of a wearable internet of things (IoT) device. The watch 100 may serve as a smart watch while maintaining an outer appearance of a conventional mechanical watch.

The PCB 140 having an inner diameter D2 and an outer diameter D3 may be shaped as a circle, a donut, or a C shape; however, it is not limited thereto. Even if it is shown in FIG. 1 that the dial pad 160 may be connected to the hands 170, the dial pad 160 may serve as a display device according to an embodiment of the present invention. The display device may be a TFT-LCD display, a LED display, an OLED display, an AMOLED display, or a flexible display.

The movement 150 may be shaped as a circle having a diameter D1 and may be disposed adjacent to the dial pad 160 and hands (for example, hour hands and minute hands, including second hands) 170 connected to the dial pad 160. Since the diameter D1 of the movement 150 may be smaller than the inner diameter D2 of the PCB 140, the movement 150 having the diameter D1 smaller than the inner diameter D2 may be sized and shaped to fit into a hole defined as the inner diameter D2 of the PCB 140. Therefore, the movement 150 may be inserted into a hole of the PCB 140.

According to an embodiment of the present invention, the movement 150 may be a mechanical movement for driving the hands 170 or an electronic movement for driving the hands 170.

The PCB 140 may include a plurality of integrated circuits (ICs) and passive elements (for example, a resistor, an inductor, or a capacitor) which may be disposed or integrated in a region RG between the inner diameter D2 and the outer diameter D3. The plurality of ICs may include an IC for a mobile payment, an IC for a health solution, an IC for a security solution, and/or an IC for an authentication solution; however, it is not limited thereto.

A first battery 130 may be disposed adjacent to the PCB 140 including the inner diameter D2 and the outer diameter D3 and may supply a first operating voltage to ICs disposed on the PCB 140. Therefore, the first battery 130 may supply the first operating voltage only to the PCB 140. According to an embodiment of the present invention, a diameter of the first battery 130 may be larger or smaller than the inner diameter D2 of the PCB 140.

According to an embodiment of the present invention, when the movement 150 is a mechanical movement, a clock function and a smart function of the watch 100 may be physically separated from each other, and accordingly, the watch 100 may serve as a clock using the mechanical movement 150 even though the first battery 130 for supplying the first operating voltage to the PCB 140 is discharged.

According to an embodiment of the present invention, when the movement 150 is an electronic movement, the watch 100 may further include a second battery 135, which may be electrically connected to the movement 150 and may not be electrically connected to the PCB 140, supplying a second operating voltage to the electronic movement 150. According to an embodiment of the present invention, a diameter of the second battery 135 may be larger or smaller than the inner diameter D2 of the PCB 140. Since the clock function and the smart function of the watch 100 may be physically separated from each other, the watch 100 may normally serve as a clock using the second battery 135 even though the first battery 130 for supplying the first operating voltage to the PCB 140 is discharged.

Even if it is shown in FIG. 1 that the second battery 135 may be disposed adjacent to the first battery 130, it is not limited thereto. According to an embodiment of the present invention, each of the batteries 130 or 135 may be a flexible battery. According to an embodiment of the present invention, each of the batteries 130 or 135 may be a battery of a rechargeable type.

According to an embodiment of the present invention, the bezel 180 may be mechanically connected to the case 120 including a crown 125 and may serve as an antenna for wireless communications. The bezel 180 may be connected to a wireless communications module mounted on the PCB 140 through a wire or a metal 121. The glass 190 connected to the bezel 180 may be replaced with a transparent display device 190.

Figure 2:
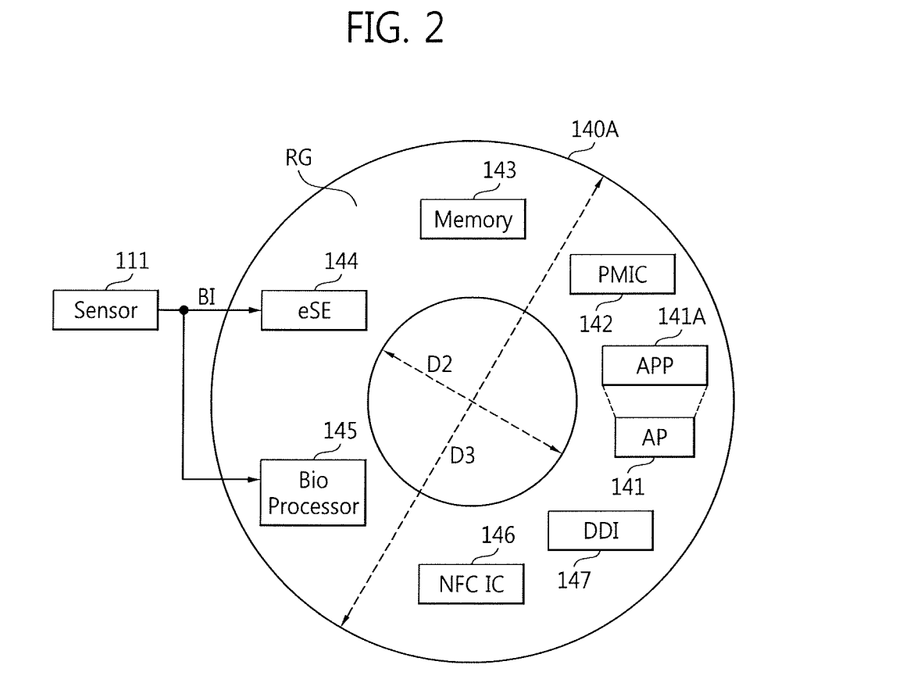
FIG. 2 illustrates a printed circuit board (PCB) of FIG. 1 shaped as a donut according to an embodiment of the present invention.
Figure 3:
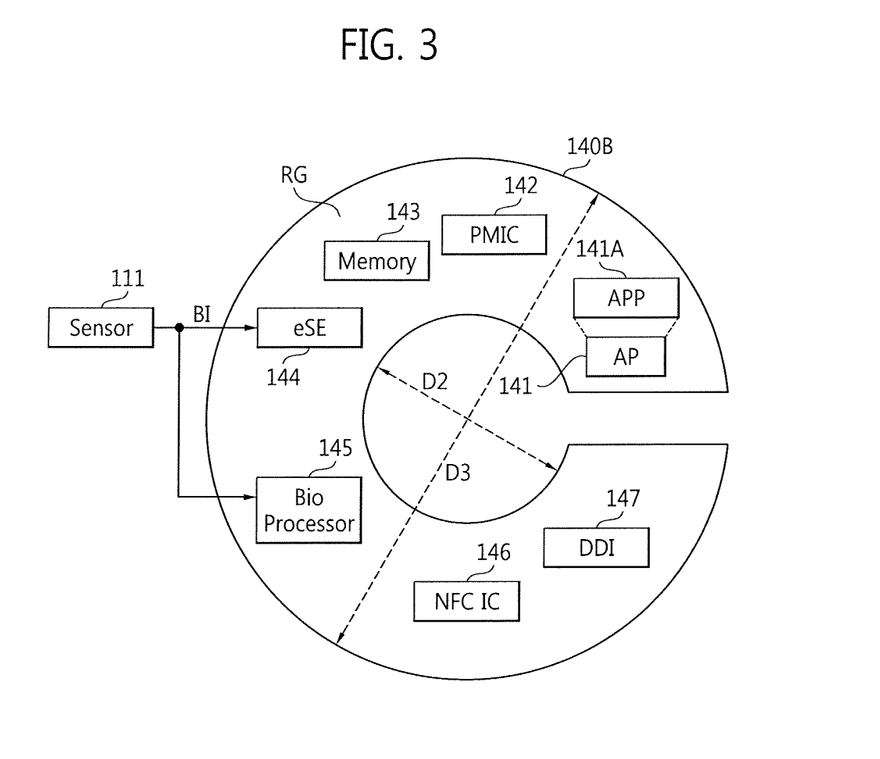
FIG. 3 illustrates a printed circuit board (PCB) of FIG. 1 shaped as a C shape according to an embodiment of the present invention.

FIG. 2 illustrates a printed circuit board (PCB) of FIG. 1 shaped as a donut and FIG. 3 illustrates a printed circuit board (PCB) of FIG. 1 shaped as a C shape according to embodiments of the present invention. Referring to FIGS. 1 to 3, a PCB 140A or 140B having an inner diameter D2 and an outer diameter D3 may include an application processor (AP) 141, a power management IC (PMIC) 142, a memory 143, a security module 144, a biological processor or bio-processor 145, a wireless communication module 146, and/or a display driver IC 147 disposed in a region RG between the inner diameter D2 and the outer diameter D3.

Although the ICs 141 to 147 disposed in the region RG between the inner diameter D2 and the outer diameter D3 on an upper surface of the PCB 140A or 140B are shown in FIGS. 2 and 3, at least one of ICs 141 to 147 may be disposed in the region RG between the inner diameter D2 and the outer diameter D3 on a lower surface of the PCB 140A or 140B according to an embodiment of the present invention.

Although passive elements (for example, a resistor, an inductor, or a capacitor) are not shown in the region RG between the inner diameter D2 and the outer diameter D3 of the PCB 140A or 140B in FIGS. 2 and 3, the passive elements may be disposed in the region RG on the upper surface of the PCB 140A or 140B and/or in the region RG on the lower surface of the PCB 140A or 140B.

The AP 141 may execute an application 141A for the smart function (for example, web-browsing, mobile payment, health solution, security solution, and/or authentication solution) used in the watch 100. The application 141A may refer to application software which may be executed on an operating system (OS). Even if one application 141A is shown in FIGS. 2 and 3, the application 141A may include applications for performing the smart functions as described above. The AP 141 may control an operation of each of the ICs 142 to 147.

The PMIC 142 may supply a corresponding operating voltage to each of ICs 141 and 143 to 147 using the first operating voltage supplied from the first battery 130.

The memory 143 may store data and programs (for example, OS and/or application(s)) to be used in the watch 100. The memory 143 may collectively represent a volatile memory and/or a non-volatile memory. The volatile memory may be a random access memory (RAM), a static RAM (SRAM), or a dynamic RAM (DRAM); however, it is not limited thereto. The non-volatile memory may be a read only memory (ROM), a flash memory, or a resistive RAM; however, it is not limited thereto.

The security module 144 may store and process security-required data (for example, data for a mobile payment or data for user authentication).

Figure 6:
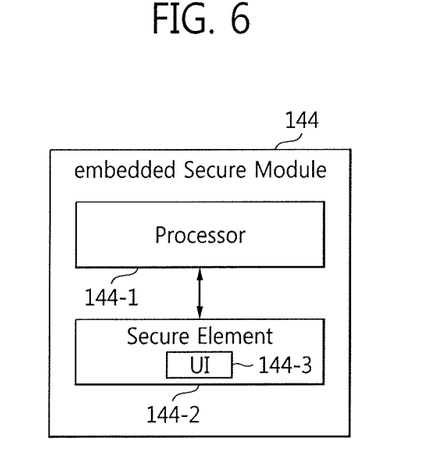
FIG. 6 is a block diagram of a security module of FIG. 2 or 3 according to an embodiment of the present invention.

FIG. 6 illustrates a block diagram of a security module of FIG. 2 or 3 according to an embodiment of the present invention. Referring to FIGS. 2, 3, and 6, the security module 144 may include a processor 144-1 and a security element 144-2. The security module 144 including the processor 144-1 and the security element 144-2 may be formed into one package, and an internal bus connecting the processor 144-1 and the security element 144-2 may be formed in the package.

The security element 144-2 may include a security function to guard against electronic theft of data. Accordingly, the security element 144-2 may include a security region 144-3 for securely storing security data UI. The processor 144-1 may be connected to the AP 141 and transmit or receive signals to or from each other.

For example, the processor 144-1 may generate security data UI by converting or encrypting biological information BI output from a bio sensor 111 into security-required data and store the security data UI in the security region 144-3 of the security element 144-2 or transmit the security data UI to the AP 141 or the bio-processor 145 from the security region 144-3 of the security element 144-2. The AP 141 or the bio-processor 145 may decrypt the security data UI to generate decrypted biological information BI.

Figure 4:
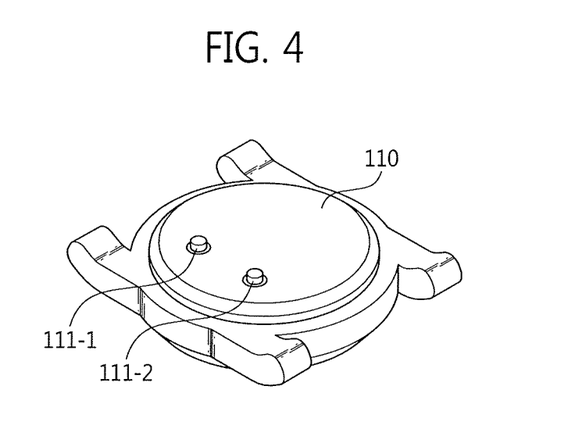
FIG. 4 illustrates bio sensors disposed on a case back of FIG. 1 according to an embodiment of the present invention.
Figure 5:
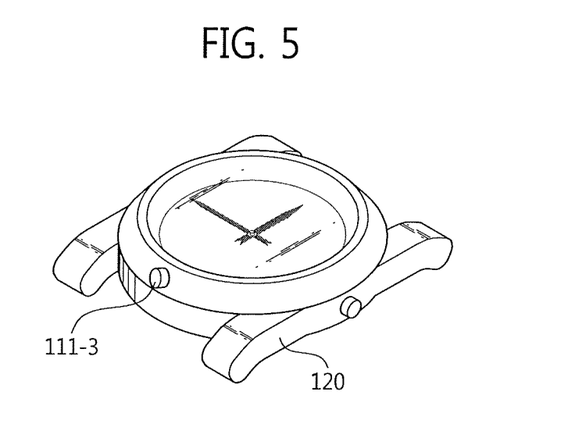
FIG. 5 illustrates a bio sensor disposed on a case of FIG. 1 according to an embodiment of the present invention.

FIG. 4 illustrates bio sensors disposed on a case back of FIG. 1 according to an embodiment of the present invention. FIG. 5 illustrates a bio sensor disposed on a case of FIG. 1 according to an embodiment of the present invention. Referring to FIGS. 2 to 6, the bio-processor 145 may process the biological information 81 output from at least one bio sensor 111 (111 collectively refers to 111-1 to 111-3) disposed on the case 120 and/or the case back 110. Data processed by the bio-processor 145 may be stored in the security region 144-3 of the security module 144 or may be stored in a security region of the memory 143 as security data.

At least one of the bio sensors 111-1 or 111-2 disposed on a lower surface of the case back 110 as shown in FIG. 4 may collect biological information BI (for example, ECG information) and at least one bio sensor 111-3 disposed on an upper surface of the case 110 as shown in FIG. 5 may collect biological information BI. According to an embodiment of the present invention, the watch 100 may include at least one of the bio sensors 111-1 to 111-3.

For example, at least one of the bio sensors 111-1 to 111-3 may measure electrocardiogram (ECG) information, photoplethysmography (PPG) information, body fat, blood pressure, blood sugar, blood oxygen saturation (peripheral capillary oxygen saturation ($SpO_2$)), or lung capacity. At least one of the bio sensors 111-1 to 111-3 may be detachable from the case 120 and/or the case back 110. The biological information BI output from at least one of the bio sensors 111-1 to 111-3 may be transmitted to the AP 141, the security module 144, and/or the bio-processor 145.

For example, the wireless communication module 146 may transmit or receive wireless signals to or from an external wireless communication device through the bezel 180 used as an antenna. The wireless communication module 146 may transmit or receive wireless signals to or from the external wireless communication device using a wireless local area network (WLAN) such as a wireless fidelity (Wi-Fi), a wireless personal area network (WPAN) such as Bluetooth, a wireless universal serial bus (USB), a Zigbee, a near field communication (NFC), a radio-frequency identification (RFID), or a mobile cellular network.

The display driver IC 147 may control an operation of the dial pad 160 or the transparent display 190 serving as a display device. According to an embodiment of the present invention, when the dial pad 160 is embodied in a display device, the display driver IC 147 may transmit display data to the dial pad 160. According to an embodiment of the present invention, when the glass 190 is replaced with a transparent display device 190, the display driver IC 147 may transmit the display data to the transparent display device 190.

Figure 7:
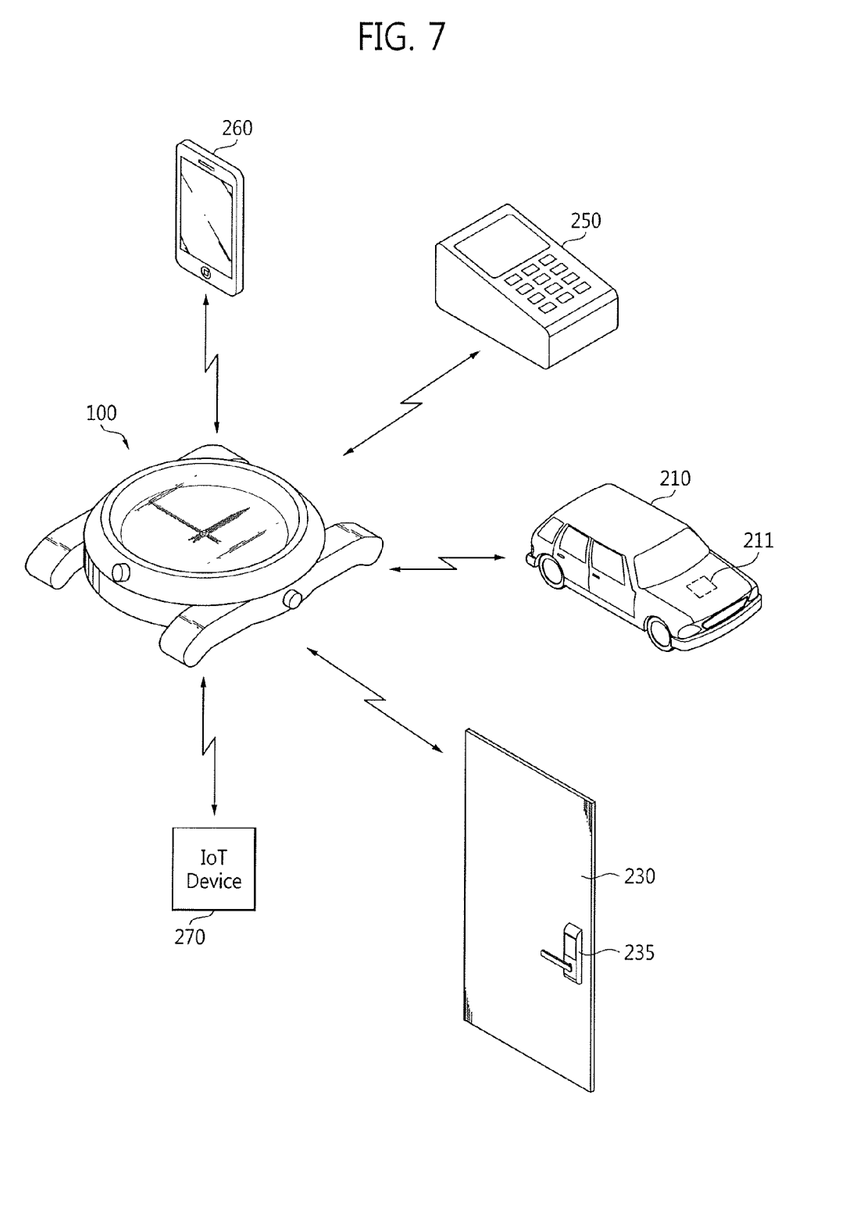
FIG. 7 illustrates usage examples of a watch of FIG. 1 as a user authentication device according to an embodiment of the present invention.

FIG. 7 illustrates usage examples of a watch of FIG. 1, which may be used as a user authentication device according to an embodiment of the present invention. Referring to FIGS. 1 to 7, the watch 100 may be used as a device for a mobile payment, a device for a health solution, a device for a security solution, or a device for an authentication solution. The watch 100 may transmit or receive a wireless signal to or from a vehicle 210, a digital door lock 235 attached to a door 230, a payment terminal 250, a smart phone 260, or an IoT device 270 using the bezel 180 connected to the wireless communication module 146.

According to an embodiment of the present invention, the watch 100 may execute a mobile payment application 141A executed by the AP 141. User payment information for a mobile payment may be stored in the security region 144-3 of the security element 144-2 of the security module 144. The mobile payment application 141A executed by the AP 141 may perform a mobile payment together with the payment terminal 250 using the user payment information stored in the security region 144-3 of the security element 144-2.

For example, the user payment information may include identification information, e.g., credit card information, password, fingerprint information, and the like for identifying a genuine user of the watch 100. For example, the identification information may be registered in the security region 144-3 of the security element 144-2 through the mobile payment application 141A by a user. The mobile payment application 141A executed by the AP 141 may transmit identification information to the processor 144-1 and the processor 144-1 may register the identification information in the security region 144-3 of the security element 144-2. The AP 141 or the processor 144-1 may encrypt the identification information and register encrypted identification information in the security region 144-3 of the security element 144-2.

When the mobile payment application 141A includes a function of generating fingerprint information of a user, the identification information registered in the security region 144-3 of the security element 144-2 includes the fingerprint information of a user. When authentication for the fingerprint information is required in a mobile payment, the fingerprint information of a user may be transmitted to the AP 141 or the bio-processor 145 through the transparent display device 190 and the AP 141 or the bio-processor 145 may transmit the fingerprint information to the processor 144-1.

The processor 144-1 may compare the fingerprint information transmitted from the AP 141 or the bio-processor 145 with the fingerprint information registered in the security region 144-3 of the security element 144-2 to authenticate whether the user is a genuine user. When the user is authenticated according to a result of the comparison, the processor 144-1 may transmit a result of the authentication to the mobile payment application 141A executed by the AP 141.

The mobile payment application 141A may transmit user payment information or credit card information only or credit card information and a password necessary for a mobile payment to the payment terminal 250 through the wireless communication module 146 based on the result of the authentication.

According to an embodiment of the present invention, the user payment information or credit card information only or credit card information and password stored in the security region 144-3 of the security element 144-2 may be transmitted to the mobile payment application 141A along with the result of the authentication. According to an embodiment of the present invention, the mobile payment application 141A may read the user payment information or credit card information only or credit card information and password from the security region 144-3 of the security element 144-2 based on the result of the authentication.

According to an embodiment of the present invention, the watch 100 may be used as a device for authenticating a user. For example, user authentication information, e.g., biological information BI may be registered in the security region 144-3 of the security element 144-2 through the user authentication application 141A. The user authentication information may be an ECG signal, a PPG signal, or fingerprint information; however, it is not limited thereto.

For example, the ECG signal or the PPG signal may be generated by the bio-processor 145 using at least two of the bio sensors 111-1 to 111-3 and may be registered in the security region 144-3 of the security element 144-2 through the user authentication application 141A.

For example, when the bio sensors 111-1 and 111-2 are brought in contact with a skin of a left wrist and the bio sensor 111-3 is brought in contact with a finger of a right hand, the bio-processor 145 may generate ECG data corresponding to an ECG signal and register the generated ECG data in the security region 144-3 of the security element 144-2 as user authentication information.

The user authentication application 141A executed by the AP 141 may transmit the user authentication information to the processor 144-1 and the processor 144-1 may register the user authentication information in the security region 144-3 of the security element 144-2. The AP 141 or the processor 144-1 may encrypt the user authentication information and may register encrypted user authentication information in the security region 144-3 of the security element 144-2.

When the user authentication application 141A includes a function of generating fingerprint information of a user, user authentication information registered in the security region 144-3 of the security element 144-2 may include the fingerprint information of a user. When authentication for fingerprint information is required to authenticate a user, the fingerprint information of a user may be transmitted to the AP 141 or the bio-processor 145 through the transparent display device 190 and the AP 141 or the bio-processor 145 may transmit the fingerprint information to the processor 144-1

The processor 144-1 may compare the fingerprint information transmitted from the AP 141 or the bio-processor 145 with the fingerprint information registered in the security region 144-3 of the security element 144-2 to authenticate whether the user is a genuine user. When the user is authenticated according to a result of the comparison, the processor 144-1 may transmit a result of the authentication to the user authentication application 141A executed by the AP 141.

According to an embodiment of the present invention, the user authentication application 141A may transmit a door control signal to a vehicle 210 through the wireless communication module 146 based on the result of the authentication. Accordingly, a door key control device 211 of the vehicle 210 may unlock a door of the vehicle 210 in response to the door control signal.

According to an embodiment of the present invention, the user authentication application 141A may transmit a door control signal to a digital door lock 235 of a door 230 through the wireless communication module 146 based on the result of the authentication. Accordingly, the digital door lock 235 may unlock the door 230 in response to the door control signal.

The watch 100 may perform wireless communication with a smart phone 260 and an IoT device 270 through the wireless communication network described above. For example, when the user authentication application 141A transmits an authentication signal generated based on the result of the authentication to the smart phone 260 or the IoT device 270 through the wireless communication module 146, the smart phone 260 may be connected to a pay website or perform a payment in response to the authentication signal. For example, when the IoT device 270 is a wireless access point, the wireless access point may connect the watch 100 to the internet or Wi-Fi in response to the authentication signal.

Figure 8:
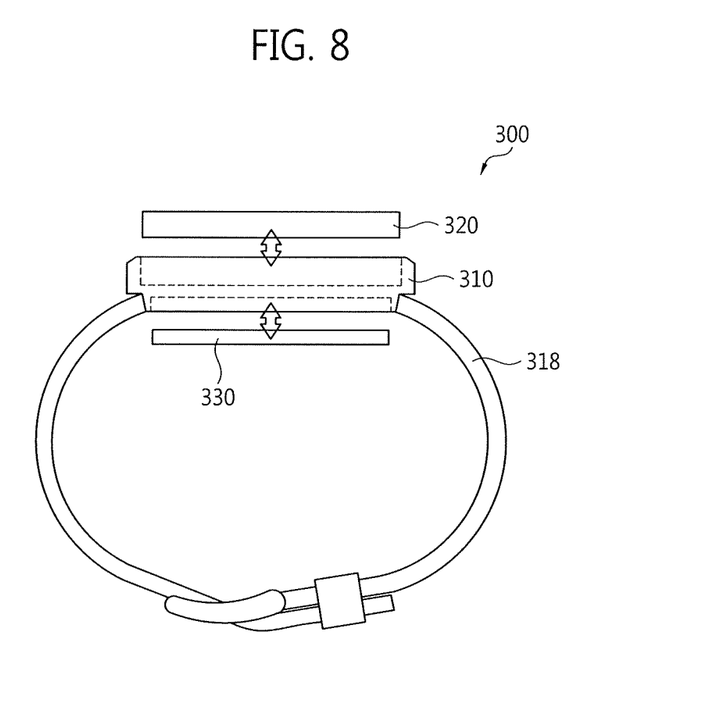
FIG. 8 is a perspective view of a watch cradle into which a watch head and a sensor module may be inserted according to an embodiment of the present invention.

FIG. 8 is a perspective view of a watch cradle into which a watch head and a sensor module may be inserted according to an embodiment of the present invention. Referring to FIG. 8, a watch 300 or a smart band 300 may include a watch cradle 310, a watch head 320 detachably attached to an upper portion of the watch cradle 310, and a band 318 connected to the watch cradle 310.

According to an embodiment of the present invention, the watch 300 may further include a sensor module 330 detachably attached to a lower portion of the watch cradle 310. The watch head 320 may refer to the watch 100 described referring to FIGS. 1 to 7. As the watch head 320 maintaining a form-factor of a traditional watch is detachably attached to the upper portion of the watch cradle 310, a user of the watch 300 may use a traditional watch and a smart watch at the same time.

Figure 9:
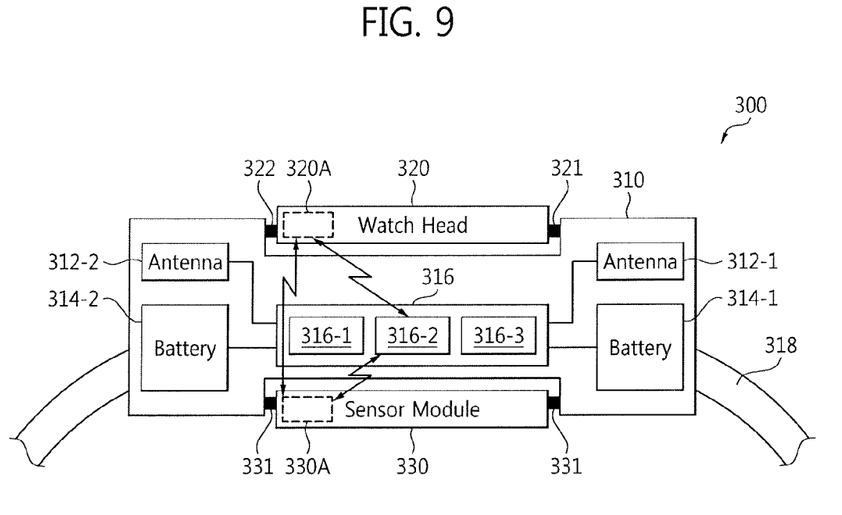
FIG. 9 illustrates components included in a watch cradle of FIG. 8 according to an embodiment of the present invention.
Figure 10:
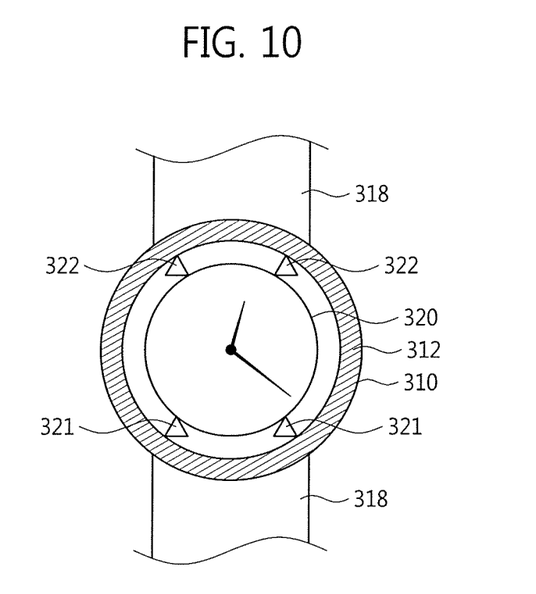
FIG. 10 illustrates a watch head coupled with a watch cradle according to an embodiment of the present invention.

FIG. 9 illustrates components included in a watch cradle of FIG. 8 according to an embodiment of the present invention. FIG. 10 illustrates a watch head coupled with a watch cradle according to an embodiment of the present invention.

Referring to FIGS. 8 to 10, the watch cradle 310 may include antennas 312-1 and 312-2, batteries 314-1 and 314-2, and a printed circuit board (PCB) 316. Even if the antennas 312-1 and 312-2 are shown to be separated from each other in FIG. 9, the antennas 312-1 and 312-2 may be embodied in a ring-shaped antenna 312 as shown in FIG. 10 and embodiments of the present invention are not limited thereto. The PCB 316 may include an AP 316-1, a first wireless communication module 316-2, and a memory 316-3. The AP 316-1 may control the first wireless communication module 316-2 and the memory 316-3.

According to an embodiment of the present invention, the AP 316-1 may perform a function of processing biological information. The AP 316-1 may execute an application for a smart function (for example, web-browsing, mobile payment, health solution, security solution, and/or authentication solution). The ICs 142, 144, 145, and 147 as shown in FIGS. 2 and 3 may be further integrated or mounted on the PCB 316.

As shown in FIG. 10, when the watch head 320 is fixed to the watch cradle 310, the watch head 320 may be fixed to the watch cradle 310 by fixing units 321 and 322. The watch head 320 may be separated from the watch cradle 310. Even if the fixing units 321 and 322 for fixing the watch head 320 to the watch cradle 310 are shown in FIG. 10, methods of fixing the watch head 320 to the watch cradle 310 are not limited thereto and may be variously changed.

When the watch cradle 310 is embodied in a circle, the antenna 312-1 and 312-2 (collectively, 312) may be disposed on the upper portion of the watch cradle 310. Accordingly, the first wireless communication module 316-2, e.g., an NFC chip, may perform various communication modes (for example, a card mode, a reader mode, and a peer-to-peer mode) through the antenna 312-1 and 312-2 (collectively, 312).

According to an embodiment of the present invention, when a portion equipped with the antenna 312 is molded in the watch cradle 310, the watch 300 may provide a waterproof function.

The sensor module 330 may be detachably attached to the lower portion of the watch cradle 310. The sensor module 330 may be fixed to the watch cradle 310 of the watch 300 by fixing units 331. The watch head 320 may include a second wireless communication module 320A for performing wireless communication with the first wireless communication module 316-2 and the sensor module 330 may include a third wireless communication module 330A for performing wireless communication with the first wireless communication module 316-2. The first, second, and third wireless communication modules 316-2, 320A, and 330A, respectively, may perform wireless communication with each other. For example, the first, second, and third wireless communication modules 316-2, 320A, and 330A, respectively, may communicate with each other through Bluetooth.

Each of various sensor modules 330 may be detachable from the lower surface of the watch cradle 310. For example, a sensor module 330 may include at least one bio sensor for measuring an ECG signal, a PPG signal, a heart rate, and/or body fat.

Biological information collected by the at least one bio sensor may be transmitted to the first wireless communication module 316-2 through the third wireless communication module 330A and the first wireless communication module 316-2 may convert the biological information into data recognizable by the AP 316-1 and transmit converted data to the AP 316-1.

An application executed by the AP 316-1 may display an ECC signal, a PPG signal, a heart rate, and/or body fat on a display device. According to an embodiment of the present invention, the application executed by the AP 316-1 may transmit a wireless signal related to the ECG signal, the PPG signal, the heart rate, and/or body fat to the second wireless communication module 320A (146 of FIGS. 2 and 3) of the watch head 320.

The second wireless communication module 320A (146 of FIGS. 2 and 3) may process the wireless signal and transmit processed data to the display driver IC 147 and the display driver IC 147 may transmit display data related to the ECG signal, the PPG signal, the heart rate, and/or body fat to the dial pad which serves as a display device (160 of FIG. 1) or the transparent display device (190 of FIG. 1).

For example, the sensor module 330 may include at least one bio sensor for measuring blood pressure. Blood pressure information collected by the at least one bio sensor may be transmitted to the first wireless communication module 316-2 through the third wireless communication module 330A and the first wireless communication module 316-2 may convert the blood pressure information into data recognizable by the AP 316-1 and transmit converted data to the AP 316-1. The application executed by the AP 316-1 may display the blood pressure information on a display device.

According to an embodiment of the present invention, the application executed by the AP 316-1 may transmit a wireless signal related to the blood pressure information to a second wireless communication module 320A (146 of FIGS. 2 and 3) of the watch head 320 through the first wireless communication module 316-2.

The second wireless communication module 320A (146 of FIGS. 2 and 3) may process the wireless signal and transmit processed data to the display driver IC 147 and the display driver IC 147 may transmit display data related to the blood pressure information to the dial pad which may serve as a display device (160 of FIG. 1) or the transparent display device (190 of FIG. 1).

For example, the sensor module 330 may include at least one bio sensor for measuring lung capacity. Lung capacity information collected from the at least one bio sensor may be transmitted to the first wireless communication module 316-2 through the third wireless communication module 330A and the first wireless communication module 316-2 may convert the lung capacity information into data recognizable by the AP 316-1 and transmit converted data to the AP 316-1. The application executed by the AP 316-1 may display the lung capacity information on a display device.

According to an embodiment of the present invention, the application executed by the AP 316-1 may transmit a wireless signal related to the lung capacity information to the second wireless communication module 320A (146 of FIGS. 2 and 3) of the watch head 320 through the first wireless communication module 316-2.

The second wireless communication module 320A (146 of FIGS. 2 and 3) may process the wireless signal and transmit processed data to the display driver IC 147 and the display driver IC 147 may transmit display data related to the lung capacity information to the dial pad which may serve as a display device (160 of FIG. 1) or the transparent display device (190 of FIG. 1).

Although several embodiments of the present general inventive concept have been shown and described, it will be appreciated by those skilled in the art that changes may be made in these embodiments without departing from the principles and spirit of the general inventive concept, the scope of the present invention as defined in the appended claims and their equivalents.

What is claimed is:
1. A watch comprising:
   a dial pad;
   a circular movement disposed adjacent to the dial pad;
   a circular printed circuit board (PCB) having an inner diameter and an outer diameter, the PCB including a hole defined as the inner diameter and a plurality of integrated circuits (ICs) disposed in a region between the inner diameter and the outer diameter, wherein the movement having a diameter smaller than the inner diameter is shaped and sized to fit into the hole;
   a first battery disposed adjacent to the PCB and supplies a first operating voltage only to the PCB; and
   a case dimensioned and shaped to receive the dial pad, the movement, the PCB, and the first battery.

2. The watch of claim 1, wherein the movement is a mechanical movement.

3. The watch of claim 1, wherein the PCB is shaped as a donut or a C shape.

4. The watch of claim 1, further comprising a bezel connected to an upper portion of the case, wherein one of the plurality of ICs is a wireless communication module for performing wireless communications with an external wireless device through the bezel and the bezel is used as an antenna of the wireless communication module.

5. The watch of claim 1, wherein one of the plurality of ICs is a display driver IC and the display driver IC drives the dial pad serving as a display device.

6. The watch of claim 1, further comprising a bezel connected to an upper portion of the case and a transparent display device connected to the bezel, wherein one of the plurality of ICs drives the transparent display device.

7. The watch of claim 1, further comprising a second battery electrically connected to the movement and not electrically connected to the PCB supplying a second operating voltage to the movement.

8. The watch of claim 1, further comprising a case back connected to a lower portion of the case and at least one bio sensor disposed on at least one of the case or the case back and collects biological information of a user,
   wherein the plurality of ICs include:
   a bio-processor for processing the biological information output from the at least one bio sensor; and
   a memory for receiving and storing information processed by the bio-processor.

9. The watch of claim 1, wherein the plurality of ICs include:
   a processor for executing a mobile payment application;

a security module including a memory for storing user payment information; and
a wireless communication module,
wherein the mobile payment application executed by the processor performs a mobile payment together with an external wireless payment device through the wireless communication module using the user payment information.

10. The watch of claim 1, further comprising a case back connected to a lower portion of the case and at least one bio sensor disposed on at least one of the case or the case back and collects biological information of a user,
wherein the plurality of ICs include:
a security module including a memory for storing authentication information of a user; and
a processor which processes the biological information output from the at least one bio sensor, compares processed biological information with the authentication information read from the memory, and authenticates the user according to a result of the comparison.

11. A watch comprising:
a dial pad;
a circular movement disposed adjacent to the dial pad;
a circular printed circuit board (PCB) having an inner diameter and an outer diameter, the PCB including a hole defined as the inner diameter and a plurality of integrated circuits (ICs) disposed in a region between the inner diameter and the outer diameter, wherein the movement having a diameter smaller than the inner diameter is sized and shaped to fit into the hole;
a first battery disposed adjacent to the PCB and supplies a first operating voltage only to the PCB; and
a case dimensioned and shaped to receive the dial pad, the movement, the PCB, and the first battery,
wherein the plurality of ICs include a wireless communication module, a display driver IC, and an application processor.

12. The watch of claim 11, wherein the movement is a mechanical movement.

13. The watch of claim 11, wherein the PCB is shaped as a donut or a C shape.

14. The watch of claim 11, further comprising a bezel connected to an upper portion of the case, wherein the wireless communication module is connected to the bezel through a wire and the bezel is used as an antenna of the wireless communication module.

15. The watch of claim 11, wherein the display driver IC transmits display data to the dial pad serving as a display device.

16. The watch of claim 11, further comprising a bezel connected to an upper portion of the case and a transparent display device connected to the bezel, wherein the display driver IC transmits display data to the transparent display device.

17. A watch comprising:
a dial pad;
a circular mechanical movement disposed adjacent to the dial pad;
a circular printed circuit board (PCB) having an inner diameter and an outer diameter, the PCB including a hole defined as the inner diameter and a plurality of integrated circuits (ICs) disposed in a region between the inner diameter and the outer diameter, wherein the mechanical movement having a diameter smaller than the inner diameter is shaped and sized to fit into the hole;
a first battery disposed adjacent to the PCB and supplies a first operating voltage only to the PCB; and
a case dimensioned and shaped to receive the dial pad, the mechanical movement, the PCB, and the first battery.

18. The watch of claim 17, further comprising a bezel connected to an upper portion of the case, wherein one of the plurality of ICs is a wireless communication module for performing wireless communications with an external wireless device through the bezel and the bezel is used as an antenna of the wireless communication module.

19. The watch of claim 17, wherein one of the plurality of ICs is a display driver IC and the display driver IC drives the dial pad serving as a display device.

20. The watch of claim 17, further comprising a bezel connected to an upper portion of the case and a transparent display device connected to the bezel, wherein one of the plurality of ICs drives the transparent display device.

* * * * *